United States Patent
Brandenburger et al.

(10) Patent No.: US 9,589,153 B2
(45) Date of Patent: Mar. 7, 2017

(54) SECURING INTEGRITY AND CONSISTENCY OF A CLOUD STORAGE SERVICE WITH EFFICIENT CLIENT OPERATIONS

(71) Applicant: INTERNATIONAL BUSINESSS MACHINES CORPORATION, Armonk, NY (US)

(72) Inventors: Marcus Brandenburger, Rueschlikon (CH); Christian Cachin, Rueschlikon (CH); Nikola Knezevic, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/790,329

(22) Filed: Jul. 2, 2015

(65) Prior Publication Data
US 2016/0048703 A1    Feb. 18, 2016

(30) Foreign Application Priority Data
Aug. 15, 2014 (GB) .................................. 1414539.5

(51) Int. Cl.
*H04L 29/00* (2006.01)
*G06F 21/64* (2013.01)
(Continued)

(52) U.S. Cl.
CPC .......... *G06F 21/64* (2013.01); *G06F 21/6218* (2013.01); *H04L 9/3247* (2013.01); *H04L 63/123* (2013.01); *H04L 67/10* (2013.01)

(58) Field of Classification Search
CPC ..... G06F 21/6218; G06F 21/64; H04L 63/00; H04L 9/3247; H04L 67/10; H04L 63/123
See application file for complete search history.

(56) References Cited

U.S. PATENT DOCUMENTS 5,504,900 A * 4/1996 Raz .................... G06F 9/4881
5,963,739 A * 10/1999 Homeier ............ G06F 11/3608
714/E11.209
(Continued)

FOREIGN PATENT DOCUMENTS

| CN | 103218574 A | 7/2013 |
|---|---|---|
| WO | 2008147400 A1 | 4/2008 |
| WO | 2012055966 A1 | 5/2012 |

OTHER PUBLICATIONS

Cachin, Christian, "Protocols for Secure Cloud Computing", IBM Research—Zurich, Apr. 2011, pp. 1-64.*
(Continued)

*Primary Examiner* — Michael Pyzocha
(74) *Attorney, Agent, or Firm* — Cantor Colburn LLP

(57) ABSTRACT

A method for providing integrity and consistency of a cloud storage service to a group of mutually trusted clients may be provided. The cloud storage service may offer a set of operations, such as read, write, update, delete in respect to stored data to the clients, whereby each client only executes its own client operations when consuming one of the set of operations of the cloud storage service, and wherein each client detects data correctness of the cloud storage service based on a protocol providing fork-linearizablity.

16 Claims, 9 Drawing Sheets

(51) Int. Cl.
*H04L 29/08* (2006.01)
*H04L 9/32* (2006.01)
*G06F 21/62* (2013.01)
*H04L 29/06* (2006.01)

(56) References Cited

U.S. PATENT DOCUMENTS

| | | | |
|---|---|---|---|
| 8,601,265 B2 | 12/2013 | Mane et al. | |
| 8,676,710 B2 | 3/2014 | Mane et al. | |
| 8,706,701 B1 | 4/2014 | Stefanov et al. | |
| 2009/0327141 A1* | 12/2009 | Rabin | G06Q 20/401 705/75 |
| 2010/0142701 A1* | 6/2010 | Volkoff | G06F 17/30156 380/28 |
| 2010/0185847 A1* | 7/2010 | Shasha | G06F 11/1004 713/150 |
| 2011/0179285 A1* | 7/2011 | Shasha | G06Q 10/06 713/189 |
| 2012/0030468 A1* | 2/2012 | Papamanthou | H04L 9/3026 713/171 |
| 2012/0144186 A1* | 6/2012 | Puiggali Allepuz | H04L 9/3013 713/150 |
| 2013/0238572 A1 | 9/2013 | Prahlad et al. | |
| 2014/0040999 A1 | 2/2014 | Zhang et al. | |
| 2014/0101103 A1 | 4/2014 | Chan et al. | |

OTHER PUBLICATIONS

Cachin, C. et al., "On Verifying the Consistency of Remote Untrusted Services", Research Report Feb. 18, 2013, 17 pages.*
Li, Cheng et al., "Making Geo-Replicated Systems Fast as Possible, Consistent when Necessary", 10th USENIX Symposium on Operating Systems Design and Implementation (OSDI '12), pp. 265-278.*
A. Shraer et al.," Venus: Verification for Untrusted Cloud Storage," ACM, 2010,pp. 1-11.
A.J.Feldman et al.,"SPORC:Group Collaboration Using Unstrusted Cloud Resources," USENIX Association Berkeley, Oct. 4, 2010, pp. 1-14.
C.Cachin et al., "Verifying the Consistency of Remote Unstrusted Services With Commutative Operations," Principles of distributed systems, Oct. 21, 2014, pp. 1-21.
C.Cachin et al.,"Efficient Fork-Linearizable Access to Untrusted Shared Memory," Principles of Distributed systems; 15th international conference, Apr. 18, 2007, pp. 1-30.
C.Cachin et al.,"Fail-Aware Untrusted Storage," International Conference on dependable system & networks, Jan. 25, 2011, pp. 1-39.
C.Cachin et al.,"On Verifying the Consistency of Remote Untrusted Services.," Research Report IBM, Feb. 18, 2013, pp. 16.
C.Cachin"Integrity and Consistency for Unstrusted Services( Extednded Abstract);" Proceedings of the 21st ACM Symposium on Operating Systems Principles, Nov. 4, 2010, pp. 1-12.
C.Martel et al.,"A General Model for Authenticated Data Structures," Algorithmica Technical report UC Davis Department of Computer Science, Dec. 6, 2001, pp. 1-19.
C.Wang et al.,"Towards Secure and Dependable Storage Services in Cloud Computing," IEEE Transactions on services computing vol. 5 Issue:2, May 30, 2011, pp. 1-14.
D.Mazieres et al.,"Building Secure File Systems Out of Byzantine Storage," Proceedings of the twenty-first annual symposium on Principles of distributed computing, Jul. 21-24, 2002, pp. 1-10.
M.Majuntke et al.,"Abortable Fork-Linearizable Storage," Proceedings of the 13th international conference on principles of distributed systems OPODIS, 2009, pp. 1-15.
M.P.Herlihy et al.,"Linearizability: A Correctness Condition for Concurrent Objects," Journal ACM Transactions on Programming Languages and systems, vol. 12, Issue 3, Jul. 3, 1990, pp. 1-30.
P.Mahajan et al., "Depot: Cloud Storage with Minimal Trust," The University of Texas at Austin, Dec. 2011, pp. 1-16.
P.Williams et al., The Blind Stone Tablet: Outsourcing Durability to Untrusted Parties, Department of Computer Science New York University, Feb. 9, 2009, pp. 1-16.
T.Kishor et al.,"Data Integrity Proof in Cloud Storage," International Journal of Emerging Technology and Advanced Engineering, vol. 4, Issue:4, Apr. 2014, pp. 1-4.
UK Search report; Application No: GB1414539.5; Patent Act 1977: Search Report under Section 17(5); date mail Feb. 26, 2015, pp. 1-4.
W. E. Weihl"Commutativity-Based Concurrency Control for Abstract Data Types" IEEE Transactions on computers, vol. 37, Issue: 12, Dec. 7, 1988, pp. 1-10.
J.Li et al.,"Secure Untrusted Data Repository(SUNDR)," Proceedings of the 6th conference on Symposium on Opearting Systems Design & Implementation vol. 6, 2004, 16 pages.
M.Naor et al.,"Certificate Revocation and Certificate Update," USENIX Security Symposium, Jan. 26-29, 1998, 13 pages.

* cited by examiner

SECURING INTEGRITY AND CONSISTENCY OF A CLOUD STORAGE SERVICE WITH EFFICIENT CLIENT OPERATIONS

FOREIGN PRIORITY

This application claims priority to Great Britain Patent Application No. 1414539.5, filed Aug. 15, 2014, and all the benefits accruing therefrom under 35 U.S.C. §119, the contents of which in its entirety are herein incorporated by reference.

BACKGROUND

The invention relates generally to a method for providing integrity and consistency of a cloud storage service to a group of mutually trusted clients. The invention relates further to a server system, a cloud system a cloud storage system, a data processing program, and a computer program product.

More and more people are outsourcing their data into the cloud, in particular cloud storage. That brings several advantages such as global accessibility, cost efficiency, and disaster protection. Particularly, collaborating on a shared resource using cloud services is easier than ever before. For example, programmers work together using online source code repositories, project teams spanning multiple companies produce complex technical deliverables, or friends simply share their holiday photo albums with others. Nevertheless, cloud services have also one serious drawback: the users rely fully on the provider in terms of confidentiality and correctness. In other words, they need to trust the cloud provider. Using modern cryptographic encryption schemes can preserve the confidentiality but cannot prevent from inadvertent or malicious modifications by the provider.

There are several disclosures related to a method for providing a cloud storage service to a group of clients.

U.S. Pat. No. 8,706,701 describes example embodiments of an authenticated file system that provides integrity and freshness of both, data and metadata. The architecture is natural to cloud settings involving a cloud service provider and enterprise-class tenants, thereby addressing key practical considerations, including garbage collection, multiple storage tiers, multi-layer caching, and check-pointing.

U.S. Pat. No. 8,676,710 discloses a method of providing security as a service in a cloud storage environment, including storing, through a cloud manager of the cloud storage environment, a security level of access of a storage controller associated with a customer of the security as a service, and receiving a request from the customer to access security information of the storage controller associated therewith.

However, there may be a need to overcome limitations of existing technologies, in particular, providing a trusted cloud storage service that is lean, reliable and that has little overhead and that addresses the integrity and consistency of data residing on untrusted cloud storage.

SUMMARY

In one aspect, a method for securing integrity and consistency of a cloud storage service to a group of mutually trusted clients includes offering, by the cloud storage service, a set of operations in respect to stored data to the clients; wherein each client only executes its own client operations when consuming one of the set of operations of the cloud storage service; and wherein each client detects data correctness of the cloud storage service based on a protocol providing fork-linearizablity.

In another aspect, a client system out of a group of mutually trusted clients for demanding services from a cloud storage service, includes an invocation unit configured to send an invocation message comprising a cryptographically signed operation for data in an invocation digital signature; a reply receiving unit configured to receive a reply-message comprising a list of pending operations, an authentication value and proof; a first sending unit configured to send a commit message comprising a test result indication that the operation is not in conflict with the pending operations list, the operation and a commitment digital signature; and a second sending unit configured to send an authentication value based on the operation and a received proof.

In another embodiment, a server system configured to perform a cloud storage service for data, wherein the cloud storage service comprises a set of operations, includes a reply unit configured to receive an invocation message comprising a list of pending operations including an operation to be executed, and a proof, and an authentication value of a last applied operation; a sending unit configured to send the proof and an authentication value for the last applied operation; a receiving unit configured to receive a commit message comprising a commit message comprising a test result indication that the operation is not in conflict with the pending operations list, the operation and a commitment digital signature; a storing unit configured to store a received authentication value; and an execution unit configured to execute the operation to be executed resulting in an applied operation.

In another embodiment, a system for securing integrity and consistency of a cloud storage service to a group of mutually trusted clients, wherein the cloud storage service is configured to offer a set of operations in respect to stored data to the clients, wherein each client is adapted to: only execute its own client operations when consuming one of the set of operations of the cloud storage service; and detect data correctness of the cloud storage service based on a protocol providing fork-linearizablity.

In another embodiment, a nontransitory computer readable storage medium having computer readable instructions stored thereon that, when executed by a computer, implement a method for securing integrity and consistency of a cloud storage service to a group of mutually trusted clients, including: offering, by the cloud storage service, a set of operations in respect to stored data to the clients; wherein each client only executes its own client operations when consuming one of the set of operations of the cloud storage service; and wherein each client detects data correctness of the cloud storage service based on a protocol providing fork-linearizablity.

BRIEF DESCRIPTION OF THE DRAWINGS

Embodiments of the invention will now be described, by way of example only, and with reference to the following drawings.

DETAILED DESCRIPTION

Figure 1:
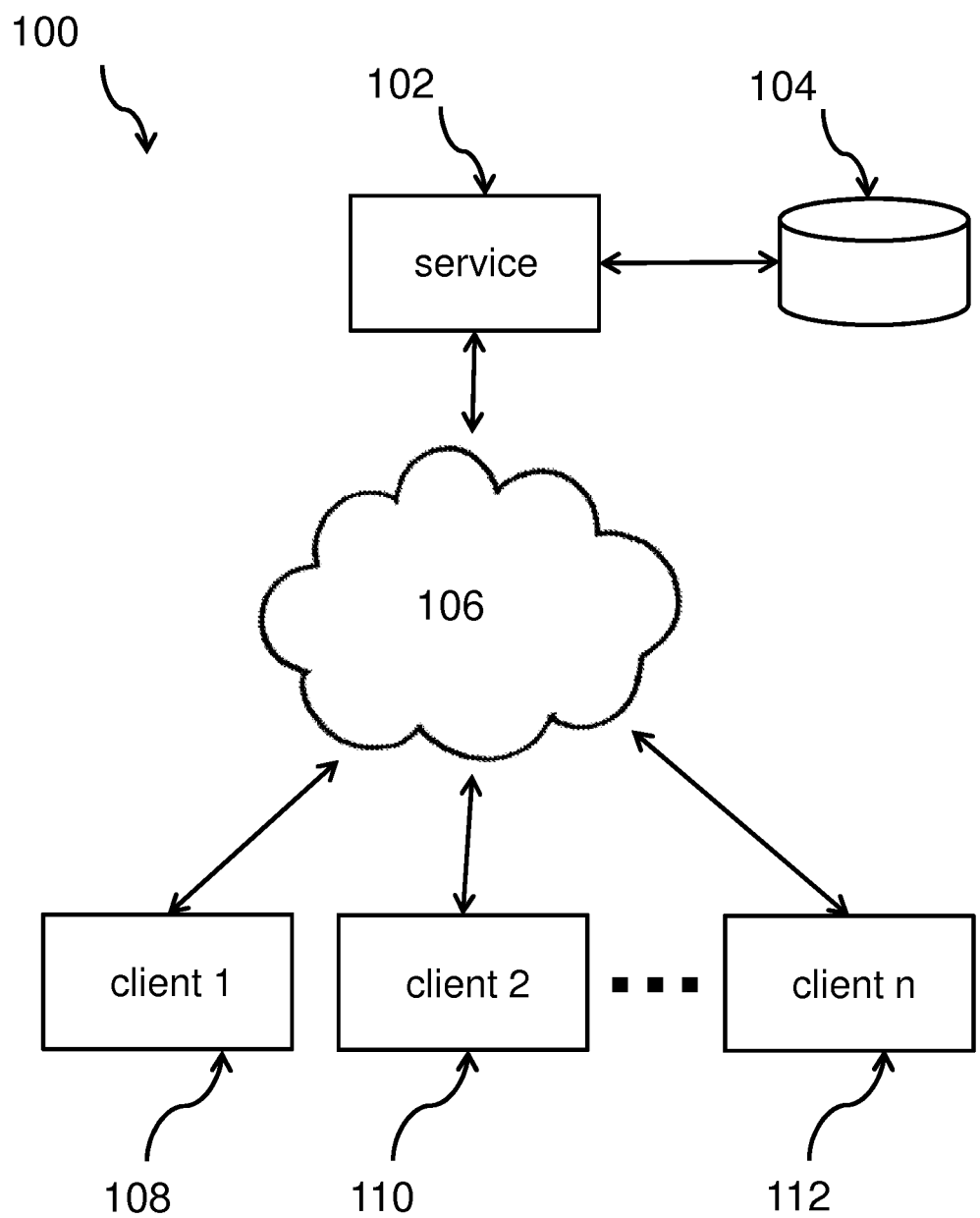
FIG. 1 shows a block diagram of an embodiment of an environment with a cloud storage service and a group of mutually trusted clients.

The above discussed drawbacks may be addressed by a method for providing integrity and consistency of a cloud storage service to a group of mutually trusted clients, a client system, a server system and a cloud storage system, a data processing program, and a computer program product, according to the independent claims.

According to one embodiment, a method for providing integrity and consistency of a cloud storage service to a group of mutually trusted clients may be provided. The cloud storage service may offer a set of operations in respect to stored data to the clients, whereby each client only executes its own client operations when consuming one of the set of operations of the cloud storage service, and wherein each client detects data correctness of the cloud storage service based on a protocol providing fork-linearizablity.

According to an embodiment of another aspect, a client system for demanding services from a cloud storage service may be provided. The client may comprise an invocation unit configured to send an invocation message comprising a cryptographically signed operation for data in an invocation digital signature, a reply receiving unit configured to receive a reply-message comprising a list of pending operations, an authentication value and proof.

The client system may also comprise a first sending unit configured to send a commit message comprising a test result indication that the operation is not in conflict with the pending operations list, the operation and a commitment digital signature and a second sending unit configured to send an authentication value based on the operation and a received proof.

According to an embodiment of a further aspect, a server system may be provided. The server system may be configured to perform a cloud storage service for data, wherein the cloud storage service may comprise a set of operations. The server system may comprise a reply unit configured to receive an invocation message comprising a list of pending operations including an operation to be executed, and a proof and an authentication value of a last applied operation. The server system may also comprise a sending unit configured to send the proof and an authentication value for the last applied operation, a receiving unit configured to receiving a commit message comprising a commit message comprising a test result indication that the operation is not in conflict with the pending operations list, the operation and a commitment digital signature, a storing unit configured to store a received authentication value, and an execution unit configured to execute the operation to be executed resulting in an applied operation.

According to an embodiment of another aspect, a cloud storage system may be provided wherein the cloud storage system may be configured to provide a cloud storage service to a group of mutually trusted clients comprising a client system and a server system.

It may be noted that the mutually trusted clients trust each other but not necessarily the cloud service.

In the context of this description, the following conventions, terms and/or expressions may be used:

The term "cloud storage service" may denote a service provided by a server for storing and manipulating data. The manipulation may be performed as one out of a set of different operations, e.g., a read operation, a write operation, an update operation and a delete operation. The data may be stored on a long-term storage. The service may be delivered as part of a cloud setup.

For a definition of the term "cloud" or "cloud computing", the reader is referred to the end of this document.

The term "mutually trusted clients" may denote a set of clients, e.g., client computers running a specific client service of which each is assumed not to manipulate data by unfair means. However, the service delivering a storage service for a group of clients may—intentionally or not—change the data in a way not compliant with the intension of the client.

The term "own client operations" may denote operations which may be performed by a dedicated client. It may not be required to minor or copy operations of other clients in order to guarantee consistency and integrity of the stored data. It may also not be required to store all data on each client.

The term "consuming" may be understood as a typical expression of cloud computing in which services of servers may be used or consumed.

The term "fork-linearizablity" may denote that operation, in particular to data, may be performed in a serialized way, e.g., one after the other in the order for all clients. However, this may not only apply for operations of one client but for operations of a group of clients. In this case, the serialized sequences of operations form a tree. A more detailed and scientific discussion is available below.

The term "integrity violation" may denote that data have been manipulated and/or modified. The data are not in a state as intended.

The term "consistency violation" may denote that the operations on the data has been executed have been applied in a wrong sequence. Thus, the data may have undergone—as last update—an applied update operation with a time-stamp earlier then an obvious update operation with a later time-stamp. Thus, a sequence of update operations may have been performed in the wrong order.

The term "pending operations list" may denote a list in which operations, not yet performed, executed or applied, may be listed. A further differentiation may be made between "self-pending operations denoting other operations of a client that await execution and "other-pending" operations denoting pending operations of other clients awaiting execution.

The term "committed operation" may—in contrast to a terminology in database technology—denote status of an operation at an end of a first phase of a protocol of the method according to embodiments of the invention. It may denote that an operation may be ready for an execution but which may not yet be applied.

The proposed method for providing integrity and consistency of a cloud storage service to a group of mutually trusted clients may offer a couple of advantages:

The consistency of the data managed by the cloud storage service may be achieved by the applied fork-linearizability as introduced by Mazieres and Shasha (cited documents see below under BG-5). A consistency and integrity verification protocol may guarantee this notion by adding condensed data about the causal evolution of a user's view into his interaction with the service, respectively the server. This ensures that when the server creates only a single discrepancy between the views of two user groups, no member of one group may have operations of the user in the other group afterwards. In other words, if the server ever lies to some users and these users communicate later among themselves, they will immediately discover the misbehavior of the server. The condensed embedded views make it very easy to discover inconsistencies; although this may be seldom, one single check and a verification of an arbitrary number of past operations for consistency may be sufficient.

It may be noted, that every client only executes its own operations with a reduced number of communication and computation steps. The cloud storage service consists of two separate services with distinct APIs, which belong together logically and are in the same trust domain. The first service provides a commodity cloud storage service, also denoted as an object storage service or a Blobstore Service. Second, the system may use a verifier service, that runs on the same (untrusted by the clients) domain as the cloud storage service. From a security standpoint, it is assumed that those services collude against the clients.

It may also be important to note that the data, jointly used by the clients, may not be required to be stored on every client. Storage occurs only once using the cloud storage service while ensuring data integrity and data consistency.

Hence, the protocol between the client and the service is executed in two phases. The first phase deals with establishing the order in which the operations will be applied, and whether the cloud storage service should apply the operation. The second phase, comprised of two additional communication steps, deals with the client creating and signing an authenticator for the result of the operation that other clients may use for further verifications. Overall, a five message communication process between a client and the cloud storage service guarantees for data integrity and consistency. The essence of verification actions in any of the steps may lie in the proofs that the cloud storage service needs to produce that the clients verify. These proofs carry the necessary context, the operation itself and the result. Using this context (a small piece of the complete data) and the operation of the result, the client is enabled to verify if the operation would indeed produce the given result.

The protocol is thus very efficient and the cloud storage service does not need to broadcast every operation to every client. A point-to-point-five-step-communication is sufficient. Efficiency here may denote that each client only executes its own operations.

According to one embodiment of the method, the data correctness may comprise integrity violations and/or consistency violations. The integrity violations may address a manipulation or modification of the data stored in the cloud storage. On the other side, consistency violations may address the problem of an executed wrong sequence of operations. Thus, if a wrong sequence of operations, e.g., updates to the data, may be performed correct data may not be guaranteed because an update with an earlier time-stamp may update data with a later time-stamp resulting in wrong final data.

According to another embodiment of the method, the operation may comprise one out of the group comprising a read operation, a write operation, an update operation, and a delete operation. These are typical operations to stored data. Every required manipulation may be performed.

A further embodiment of the method may also comprise establishing an order in a pending operations list indicating the order—in particular by a sequence number—in which operations from different clients will be applied to the stored data. This may be achieved by receiving a commit-message for a committed operation. The order of pending operations may be agreed between a client and the service. A series of messages may be exchanged between the client and the service (e.g., message 1 to 3, see below as explained).

It may also be noted that a COMMIT message may not be a commit in the sense of a typical database operation. In such a case, a commit finalizes a transaction and a rollback may not be possible after a commit in a database. Here, a COMMIT message may only signal that an operation may be performed and that such an execution may not be aborted because, e.g., a sequence of operation may be wrong. Thus, the COMMIT message here may denote a "pre-committed operation" which may not be finalized or applied. Instead, it may signal that it may denote a finalization of a first phase of the overall operation's procedure. The list of pending operations may have been sent to a client together with an authentication value (a); the client may now calculate a test result (z) based on a determination whether the operation may commute with the list of pending other operations (pending-others). In case of a success, a response may be calculated and sent as COMMIT from the client to the service.

The method may further comprise sending an update-authentication-message—which may be a fourth message as part of a protocol between the client and the service—from the service to the client. The client may have issued the operation. The update-authentication-message may comprise a proof of the execution (s0) of the operation, and an authentication value (a) for the last applied operation. This way, a secure communication may be achieved.

A further extension of the method may also comprise receiving an authentication value (a') being generated based on an authentication value (a)—in particular, the operation (o) and the proof (s0)—and a commitment digital signature (p-sig) which may be comprised in a COMMIT-AUTH message from the client to the server. It may be generated by cryptographically signing the operation (o) and the authentication value (a'). Again, this may be required for a secure communication.

According to a further embodiment, the method may also comprise storing the authentication value (a'). This may be a proof that the service operation has been performed correctly; a' will always be sent to the client. The method may also comprise an execution of the operation (o) on the data by the cloud storage service resulting in an applied operation (o). Thus, the operation that may have been committed in an earlier stage may now be applied. In the context of a classical database transaction, this final applying of the operation may conform to a commit in a database system. Thus, there is a clear distinction between a classical database and the cloud storage service, as discussed here.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, an overview block diagram of an environment of an embodiment of the inventive method for providing integrity and consistency of a cloud storage service to a group of mutually trusted clients is given. Afterwards, further detailed embodiments of sub-blocks of the method will be described. Additionally, embodiments of client-side elements and service-side elements will be described as well as an example of a computing system.

Before a detailed description of the figures will be provided, a more scientific or abstract background may be presented. Firstly, attention may be drawn to some technical and scientific background literature:

BG-1: C. Cachin, I. Keidar, and A. Shraer, "Fail-aware untrusted storage", SIAM Journal on Computing, vol. 40, pp. 493-533, April 2011;

BG-2: C. Cachin and O. Ohrimenko, "Verifying the consistency of remote untrusted services with commutative operations," Report arXiv:1302.4808v2, CoRR, December 2013;

BG-3: A. J. Feldman, W. P. Zeller, M. J. Freedman, and E. W. Felten, "SPORC: Group collaboration using untrusted cloud resources," in Proc. 9th Symp. Operating Systems Design and Implementation (OSDI), 2010;

BG-4: P. Mahajan, S. Setty, S. Lee, A. Clement, L. Alvisi, M. Dahlin, and M. Walfish, "Depot: Cloud storage with minimal trust", in Proc. 9th Symp. Operating Systems Design and Implementation (OSDI), 2010;

BG-5: D. Mazieres and D. Shasha, "Building secure file systems out of Byzantine storage", in Proc. 21st ACM Symposium on Principles of Distributed Computing (PODC), 2002;

BG-6: A. Shraer, C. Cachin, A. Cidon, I. Keidar, Y. Michalevsky, and D. Shaket, "Venus: Verification for untrusted cloud storage", in Proc. Cloud Computing Security Workshop (CCSW), ACM, 2010;

BG-7: P. Williams, R. Sion, and D. Shasha, "The blind stone tablet: Outsourcing durability to untrusted parties", in Proc. Network and Distributed Systems Security Symposium (NDSS), 2009.

Thus, general fundamentals of cloud storage services are assumed to be understood and do not need further, detailed explanation.

Generally, a system consisting of a group of mutually trusting users may be assumed that collaborate using a commodity cloud storage service. The users do not put any trust on the cloud storage service. Further, to facilitate collaboration, the users run software clients (referred to as clients that do not communicate directly with each other, but know identities of other clients or users, as well as corresponding public keys, i.e., digital signatures. In order to ensure data integrity and consistency, the clients may adhere to the protocol while using a cloud storage service. The provided storage service may allow clients to store, retrieve, and list data and metadata under the cloud storage service that provides key-value store semantics, i.e., each data has an associated unique name or key value.

The cloud storage service may consist of two separate services with distinct APIs, which may belong together logically and may be in the same trust domain. The first service provides a commodity cloud storage service, also called an object storage service or a Blobstore Service. Secondly, the system assumes a verifier service that may run in the same untrusted domain as the cloud storage service. From a security standpoint, it may be assumed that both services collude against the clients. The verifier service may be responsible for coordinating the clients' operations and for storing additional information to help verify the integrity and consistency of the stored data. The crux of the protocol may involve storing a short cryptographic hash value of the data, both, at the verifier and locally at the client. Naturally—because the verifier is not trusted—the clients sign the hash value before storing it at the verifier, and verify the signature after retrieving the hash value from the verifier.

For each operation, clients may consult both, the verifier service and the cloud storage service. For example, when a client, participating in the protocol, invokes a read operation (also called GET) for a particular data item, it first queries the verifier service to fetch the hash value corresponding to the item. If there is a conflict with other operations, for example, due to an in-progress write of the same data item, the query will be aborted and the user would receive a notification. Otherwise, the client could download the data item from the cloud storage, and compare its hash value with the hash value retrieved from the verifier. Upon successful match, the client returns the data to the user, or otherwise provides a notification about violation.

Conversely, when uploading a data item (also called PUT), the client may assign it a unique identifier, e.g., a name, and may start the upload process. Once the client may finish the upload, and provided that there was no conflict, he may contact the verifier to store the corresponding hash value of the data item.

Clients participating in the protocol according to embodiments of the invention may detect integrity and consistency violations upon contacting other clients. The clients may achieve fork-linearizability, as each client may embed the causal information about data evolution in the cryptographic hash that it posts at the verifier and signs. As the clients may abort their operations when they detect a conflict, they exhibit a non-blocking behavior, which yields higher throughput, in particular, compared to blocking behavior.

The protocol coordinates the consistency information about the stored data in a non-trivial way, which ensures that not all clients have to be involved in every operation. In existing protocols, in particular in the BST and the COP protocols as described by BG-7 and BG-2 (see above) in the first section, a client would execute its operation, potentially return an output value to the application, and in the same step also commit to the operation by the signature mentioned above. The verifier would subsequently broadcast such commit-data to all clients in the global order of operations established by the verifier. Every client needed to re-play through the whole sequence of these commits, verifying their correctness, and do local book-keeping.

The proposed method may relieve the clients from the need to replay the sequence of all operations. In particular, the responsibility to maintain the storage system's coordination state is moved to the cloud service. By protecting the responses from the cloud verifier service to a client through an authenticated data structure, the client outputs cannot be forged. By protecting the authenticators through digital signatures, one client may receive integrity information about the "valid" system state in a protected way, as the cloud services cannot subvert the signature scheme. This client, then, may obtain the current state from the server and verify its validity because the state is logically protected by the transitive combination of the authenticator and the signature. In traditional solutions, clients kept authentication information only locally and did not exchange it through the verifier because the protocol structure prevented it. They had to process every operation of every other client. Methods according to embodiments of the invention change the protocol in a way that enables the clients to obtain this information through the verifier, which results in large savings for the clients and for the overall system.

For example, methods according to embodiments of the invention may allow clients to be offline or inactive after completing their operations for a potentially unbounded amount of time, as the verifier will hold the cryptographic hashes signed by clients. They only need to join the system again when performing an operation. In a system with n clients that performs h storage operations, the traditional system requires about $\theta(nh)$ computation steps by all clients together. With the systems according to embodiments of the invention, this can be reduced to $O(n)$ steps in the best case.

The Model

System Model

We consider an asynchronous distributed system with n mutually trusting clients $C_1, \ldots, C_n$ and a server S (collectively called parties). The communication between the server and the clients is assumed to be reliable and respects first-in/first-out (FIFO) semantics. A protocol P specifies the behavior of all involved parties. All clients are correct and hence following P; in particular they do not crash. In contrast, the server might be either correct or Byzantine and may deviate arbitrary from P. The assumption that clients do not crash is for simplicity only; there are well-known methods to extend the protocol to support crashes. For example: The group should be adjusted dynamically or a single crashed client might hold up progress of other clients forever. Previous work on the topic has explored how a group manager or a peer-to-peer protocol may control a group membership protocol (see, for example, in Jinyuan Li, Maxwell Krohn, David Mazi'eres, and Dennis Shasha. Secure untrusted data repository (SUNDR), pages 121-136, 2004; or Alexander Shraer, Christian Cachin, Asaf Cidon, Idit Keidar, Yan Michalevsky, and Dani Shaket, Venus: Verification for untrusted cloud storage. In Proceedings of the 2010 ACM Workshop on Cloud Computing Security Workshop, CCSW '10, pages 19-30, New York, N.Y., USA, 2010. ACM).

Authenticated Data Structures

The model of authenticated data structures is a well-known way to verify the integrity of outsourced data on untrusted resources. See, for example, in Charles Martel, Glen Nuckolls, Premkumar Devanbu, Michael Gertz, April Kwong, and Stuart G. Stubblebine. A general model for authenticated data structures. Algorithmica, 39(1):21-41, January 2004; or Moni Naor and Kobbi Nissim. Certificate revocation and certificate update. In Proceedings of the 7th Conference on USENIX Security Symposium-Volume 7, SSYM'98, pages 17-17, Berkeley, Calif., USA, 1998. USENIX Association.

Assume a two party model where an untrusted server maintains a collection D of arbitrary data objects and a client may invoke query and update operations. The client may verify the integrity of a response to an operation from a cryptographic proof, so that the client can detect whether the data object was tampered with by an adversary.

In practice, the client may store some authentication data, which is usually much smaller than the outsourced data, in a local trusted memory.

Functionality.

The server may provide a deterministic functionality F, e.g., a key-value storage service based on an authenticated data structure, to the clients. Clients interact with F via a set of operations O. An operation may contain several arguments. Very abstractly, the server maintains a shared state $s \in S$ of F, initially denoted by s0, for example, this includes all data stored on the cloud service. The state is sometimes also called D. The scheme works as the following: Once the server receives an operation o from a client, the server should update the state by executing $(s', r) \leftarrow F(s, o)$, send the response $r \in R$ to the client, and make s' the new state.

However, in order to support the functionality of an authenticated data structure one need to separate the execution of F into several steps and extend the server's state s with a corresponding cryptographic proof in the form of an authenticator.

Here, the notion of authenticated separated execution of Cachin may be adapted (see: Christian Cachin. Integrity and consistency for untrusted services. In Proceedings of the 37th International Conference on Current Trends in Theory and Practice of Computer Science, SOFSEM'11, pages 1-14, Berlin, Heidelberg, 2011. Springer-Verlag), where the server may produce an extracted partial state for the client and the client is responsible for computing the authenticator in respect of the current state and the operation.

More precisely, an algorithm $extract_F$ produces a partial state $s_o$ from a global state s and an operation o, $$s_o \leftarrow extract_F(s,o).$$

There is an authenticator denoted by a, which is initialized to a default value $a_{F0}$. An Algorithm $authexec_F$, run by the client, takes a, $s_o$, and o as inputs and produces an updated authenticator a', a partial updated state $s'_o$, and a response r. In the course of executing o, the algorithm also may verify its inputs with respect to a and may output the special symbol $\perp$ as response, indicating that the verification failed. In other words, $$(a',s'_o,r) \leftarrow authexec_F(a,s_o,o),$$

with $r = \perp$ if, and only if, verification failed. Additionally, we say that o can also be a sequence of operations $o_1, \ldots$ , $o_m$ and its execution works analogously to authenticated separated execution of an single operation.

The security property considers a faulty S as an adversary, which tries to forge some partial state $\tilde{s}_o$ that causes the client to produce a wrong response $\tilde{r}$. But in an authenticated separated execution scheme, algorithm authexec$_F$ either outputs the correct response ($\tilde{r}=r$), or it recognizes the forgery and the verification fails ($\tilde{r}=\bot$). In a secure execution-authentication scheme, it holds that the adversary cannot produce such a wrong response that is accepted by authexec$_F$ (it outputs a value different from $\bot$) but the response is not equal to r; in other words, the only valid response to operation o in state s is the value r.

Commutative Operations

The protocol according to embodiments of the invention may take advantage of using the concept of commutative operations thereby one is able to process multiple operations concurrently. Commutative operations are well-known from the study of concurrency control (see, e.g., W. E. Weihl). Commutativity-based concurrency control for abstract data types. In Proceedings of the Twenty-First Annual Hawaii International Conference on Software Track, pages 205-214, Los Alamitos, Calif., USA, 1988. IEEE Computer Society Press; or G. Weikum and G. Vossen. Transactional Information Systems: Theory, Algorithms, and the Practice of Concurrency Control and Recovery, Morgan Kaufmann Publishers, San Francisco, Calif., 2002).

As described in Christian Cachin and Olga Ohrimenko, "Verifying the consistency of remote untrusted services with commutative operations", 02 2013, two operations $o_1, o_2 \in O$ are said to commute in a state s if, and only if, there operations, when applied in different orders starting from s, yield the same respective states and responses. In the proposed protocol that definition is relaxed and focus is only on the operations itself, not on the resulting state. That is sufficient for our purpose since the clients may check whether two operations commute or not, without the knowledge of the state. Therefore, a function commute$_F$ may be defined which takes two operations $o_1, o_2 \in O$ and returns true if, and only if, there is no conflict with respect to F; otherwise commute$_F$ ($o_1, o_2$) returns false. Operations that do not commute are meant to be in conflict. In practice, however, two operations would conflict if they are write-operations on the same data object.

Furthermore, this notion for sequences of operations may be extended. Supposed two sequences $\rho_1$ and $\rho_2$ consisting of operations in O commute if, and only if, each operation o in $\rho_1$ commutes with all operations in $\rho_2$. Formally, we denote a sequence of operations $\rho=(o_1, \ldots, o_k)$.

Aborts

As in previous work, the used notion of commutative operations and operations may conflict (compare Christian Cachin and Olga Ohrimenko: Verifying the consistency of remote untrusted services with commutative operations, 02 2013; and Matthias Majuntke, Dan Dobre, Marco Serafini, and Neeraj Sufi: Abortable fork-linearizable storage, volume 5923, pages 255-269, Springer, 2009). When a client invokes an operation that conflicts with an operation of another client, but that operation has not been committed yet at the server, then the client has to abort the conflicting operation. Otherwise, the protocol cannot ensure fork-linearizability.

Consistency Properties

The formal definition of the consistency achieved by the protocol is included here; it is the same as achieved by previous works (compare Christian Cachin and Olga Ohrimenko: Verifying the consistency of remote untrusted services with commutative operations, 02 2013; and Christian Cachin, Abhi Shelat, and Alexander Shraer: Efficient fork-linearizable access to untrusted shared memory, In Proceedings of the Twenty-sixth Annual ACM Symposium on Principles of Distributed Computing, PODC '07, pages 129-138, New York, N.Y., USA, 2007. ACM).

Here, the standard notion of linearizability is used (as in Maurice P. Herlihy and Jeannette M. Wing. Linearizability: A correctness condition for concurrent objects. ACM Trans. Program. Lang. Syst., 12(3):463-492, July 1990), which requires that the operations of all clients appear to execute atomically in one sequence and its extension to fork-linearizability (compare David Mazières and Dennis Shasha. Building secure file systems out of Byzantine storage. In Proceedings of the Twenty-first Annual Symposium on Principles of Distributed Computing, PODC '02, pages 108-117, New York, N.Y., USA, 2002. ACM.; and Christian Cachin, Abhi Shelat, and Alexander Shraer. Efficient fork-linearizable access to untrusted shared memory. In Proceedings of the Twenty-sixth Annual ACM Symposium on Principles of Distributed Computing, PODC '07, pages 129-138, New York, N.Y., USA, 2007. ACM), which relaxes the condition of one sequence to permit multiple "forks" of an execution. Under fork-linearizability, every client observes a linearizable history and when an operation is observed by multiple clients, the history of events occurring before the operation is the same.

Definition 1 (View):

A sequence of events $\pi$ is called a view of a history $\sigma$ at a client $C_i$ with respect to a functionality F if:

1. $\pi$ is a sequential permutation of some subsequence of complete operations in a;

2. all complete operations executed by $C_i$ appear in $\pi$; and

3. $\pi$ satisfies the sequential specification of F.

Definition 2:

(see also: Linearizability, see also Maurice P. Herlihy and Jeannette M. Wing. Linearizability: A correctness condition for concurrent objects. ACM Trans. Program. Lang. Syst., 12(3):463-492, July 1990).

A history $\sigma$ is linearizable with respect to a functionality F if there exists a sequence of events $\pi$ such that:

1. $\pi$ is a view of $\sigma$ at all clients with respect to F; and

2. $\pi$ preserves the real-time order of $\sigma$.

Definition 3:

(Fork-linearizability, see also David Mazières and Dennis Shasha. Building secure file systems out of Byzantine storage. In Proceedings of the Twenty-first Annual Symposium on Principles of Distributed Computing, PODC '02, pages 108-117, New York, N.Y., USA, 2002. ACM).

A history $\sigma$ is fork-linearizable with respect to a functionality F if for each client $C_i$ there exists a sequence of events $\pi_i$ such that:

1. $\pi_i$ is a view of $\sigma$ at $C_i$ with respect to F;

2. $\pi_i$ preserves real-time order of $\sigma$; and 3. for every client $C_j$ and every operation $o \in \pi_i \cap \pi_j$ it holds that $\pi_i|^o = \pi_j|^o$ Cryptographic Primitives The proposed protocol uses cryptographic hash functions and digital signature schemes. These are standard cryptographic tools.

The Generic Protocol

More details of the protocol may be extracted from the figures below.

Notation

A variable p can hold a tuple which is denoted by $p \leftarrow (x, y, z)$. To access a tuple's content we use $(x, y, z) \leftarrow q$. Sometimes we only want to access a subset of a tuple, so we use (•, •, y)←q, where "•" stands for unneeded elements. The concatenation of bit strings is denoted by operation k. The function length (a) for a list a denotes the number of elements in a. The implementation uses associative arrays or maps, which associate keys to values—a value is stored in a map H by assigning it to a key, denoted by H[k]←v; if no value has been assigned to a key, the map returns ⊥.

Overview

The sequence of messages from and to the client, from and to the service respectively, follows the flow:

INVOKE→REPLY→COMMIT→UPDATE-AUTH-
→COMMIT-AUTH

A client $C_i$ starts by sending an INVOKE message with an operation o to the server S. The server assigns a global sequence number to the operation and replies back a list of pending operations with the corresponding partial state and its authentication data. We distinguish between pending-other, which are operations invoked by other clients and pending-self that are invoked by $C_i$ up to o. After receiving the REPLY message from S, the client verifies the message content and simulates the execution of all pending-self operations. If o commutes with all pending-other operations, he simulates o as well and returns with the response. In addition to that, $C_i$ flags the operation as SUCCESS or ABORT according to the commutativity check.

Subsequently, the client sends a COMMIT message for o to the server. At this point, the client may invoke the next operation or retry in case of an abort. Due to the assumption of an asynchronous system, the server may receive the COMMIT message from $C_i$ before it receives any other COMMIT message with respect to the global order. For that particular reason the server maintains another sequences number b, which indicates the global sequence number of the last applied operation. Hence, the server buffers all incoming COMMIT messages and continues processing the message with the sequence number next to b once available. If the operation o was aborted, the server would increment b and nothing else would have to be done for this operation.

Processing of a successful operation o requires some additional steps. The server sends an UPDATE-AUTH message including the corresponding partial state. When $C_i$ receives this message, it simulates the execution of o and computes new authentication data a according to the partial state and o. Next, it replies the authentication data to S. Finally, the server stores a and executes o (or applies o) on its state.

Data Structures

The server and every client maintain a set of variables during the protocol. For simplicity and readability it is not described how unnecessary data is garbage-collected. Every client may store the sequence number of the last operation that has been committed in a variable c. H may be a map containing a hash chain computed over the last committed operation and the sequence of pending operations announced by the server S. The contents of H are indexed by the sequence number of the operations. Entry H[1] is computed as hash (H[1−1]||o||l||i), with H[0] =NULL, and represents an operation o with sequence number 1, executed by $C_1$. Variable Z maps the sequence number of every operation that the client has executed himself to the status of the operation. The client only needs the entries in Z with index greater than c. Finally, a variable u is set to o whenever the client has invoked an operation o but not yet completed it; otherwise u is ⊥.

The server keeps the global sequence number for the invoked operations in a variable t. In addition to that, it holds in b the sequence number of the last applied operation. All invoked operations are stored in a map I and the completed operations in a map O, both indexed by a sequence number. Finally, the server maintains an arbitrary authenticated data structure D with a functionality F. The corresponding authenticator for every operation is stored in a map A, also indexed by the sequence number. D reflects all successful operations with respect to F up to the sequence number b.

Description

The integrity protocol may be called by a client through a function int-invoke, to which the actual operation according to the functionality F is passed as parameter o. The figures below illustrate that. Asynchronous handlers may be used that react to messages and the invocation of int-invoke terminates by executing return at the end of the handler for the REPLY message. Another client-side handler continues asynchronously in the background.

The protocol initially proceeds in a similar way as the authenticated version of COP (compare Christian Cachin and Olga Ohrimenko. Verifying the consistency of remote untrusted services with commutative operations. 02 2013). The client computes the INVOKE message and the COMMIT message accordingly. The difference arises on the server's side, when a COMMIT message arrives. Instead of using a broadcast to disseminate the committed operation to all clients, the server buffers it until all previous operations have been executed. At this time (denoted upon O[b+1]≠⊥ ∧ A[b+1]=⊥ in the protocol), the server extracts the partial state $s_o$ from the current state D. Together with the previously computed authenticator (taken from A[b]), this partial state allows the client to verify the authenticity of the response for the operation. The server sends this in an UPDATE-AUTH message to the client.

For processing an UPDATE-AUTH message, the client verifies that the COMMIT-signature on the previous operation in the sequence (at index q in the client's code) is valid and that there is also a valid authenticator for this operation, as signed by the client executing the last operation.

Then, the client invokes authexec to verify the partial state and generate a new authenticator a according to the result of the operation o and a signature. The new authenticator a and its signature ψ are sent back to the server in a COMMIT-AUTH message. The server stores them and passes them along to further clients, who either invoke an operation (via a REPLY message) or commit/authenticate an operation (via a UPDATE-AUTH) message. After receiving COMMIT-AUTH, the server also (finally) executes this operation on the service state D and updates D accordingly.

Communication

The execution of an operation requires the client to perform one round-trip to the server: Send an INVOKE message and receive a REPLY, then the client is ready to output the response of the operation. Successful operations that commute with pending operations of others therefore terminate fast. Decoupled from the execution of an operation and in the background, the server and the client subsequently perform the remaining three flows of the communication protocol.

More precisely, when all previous operations have been executed at the server, the server sends an UPDATE-AUTH message and receives a COMMIT-AUTH in response from the client. The dissemination of the latest authenticator takes place in the server's REPLY message in response to an invocation. This means that a client may be offline and inactive in the meantime, without needing to be notified of operations by others.

According to the protocol, the clients do not communicate with each other. However, as soon as they do, they benefit from fork-linearizability and can easily discover a consistency violation by comparing their hash chains.

The size of the INVOKE, COMMIT and COMMIT-AUTH messages is independent of the number of clients and their operations. These messages contain only a description of one operation, while the REPLY and UPDATE-AUTH messages contain the list of pending operations w and a partial state $s_o$. If one client is slow, then the length of w for all other clients should, in principle, grow proportionally to the number of further operations they are executing. However, this can be compressed by omitting, from the REPLY message, those pending operations that have already been included and sent to the client before. The size of the partial state is directly related to the chosen data structure and the number of operations with respect to F. In practice, authenticated data structures such as skip lists and Merkle hash trees permit very small authenticators and partial states, respectively.

After this more abstract background, the figures will be described:

FIG. 1 shows a block diagram of an embodiment of an environment 100 with a cloud storage service 102 and a group of mutually trusted clients 108, 110, 112. The clients 108, 110, 112 may trust each other but not necessarily the cloud storage service 102 or the communication with a network 106, e.g., the Internet.

The cloud storage service 102 may be executed on a server (not shown) which may be connected to a storage medium 104. The cloud storage service 102 may perform a set of operations with respect to stored data to the clients 108, 110, 112.

Each client 108, 110, 112 may only execute its own client operations, i.e., each client 108, 110, 112 only needs to verify the execution of its own commands to the cloud storage service 102 and not the one's of any other clients 108, 110, 112 when consuming one of the set of operations of the cloud storage service. No client may be forced to perform and/or mirror operations of other clients 108, 110, 112.

Each client 108, 110, 112 may detect data correctness of the cloud storage service 102 based on a protocol providing fork-linearizablity in respect to operations from several clients 108, 110, 112. All operations may be performed in a linear order.

Figure 2:
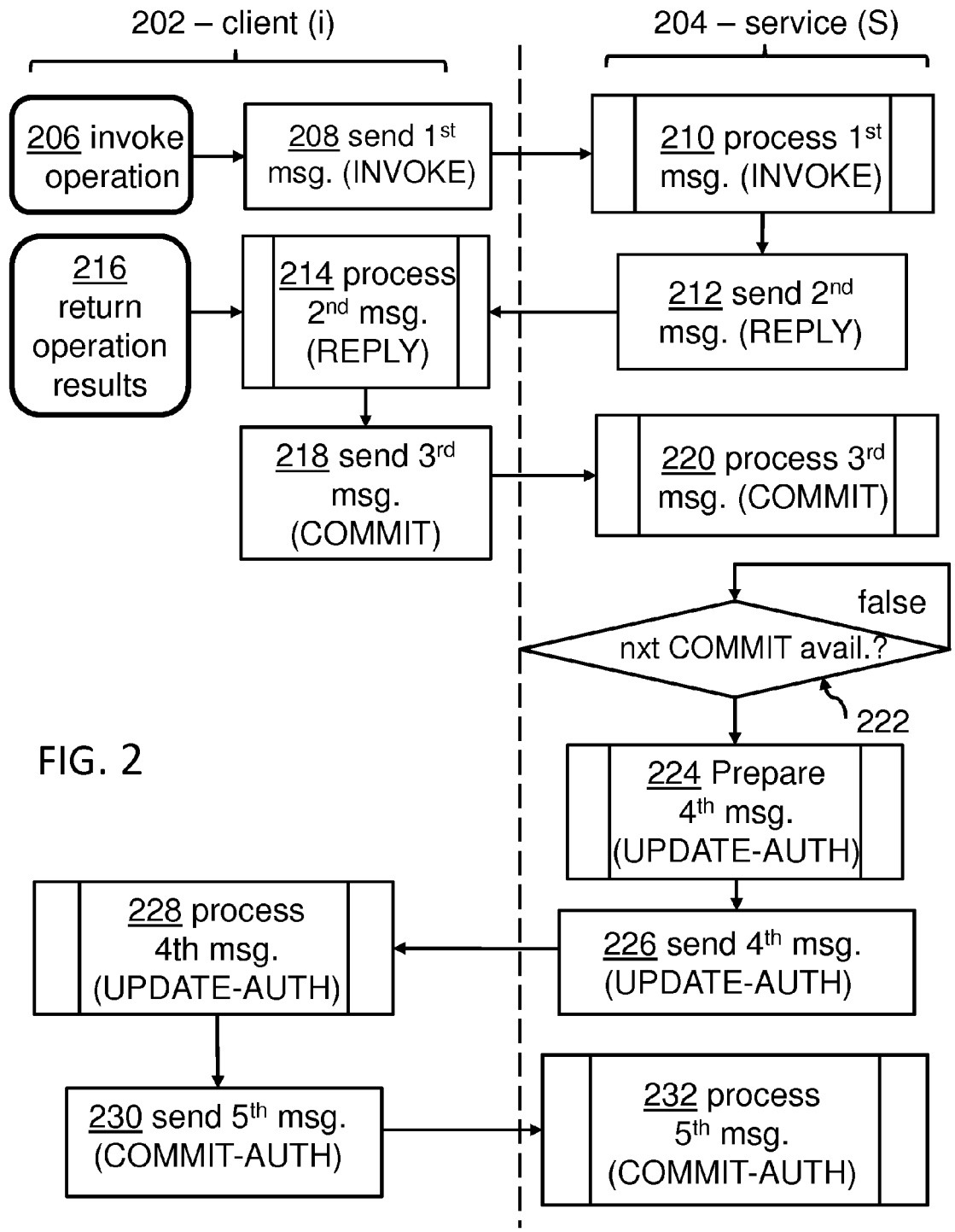
FIG. 2 shows an overview in a block diagram form of the overall protocol.

FIG. 2 shows an overview in block diagram form of the overall protocol. The client-side is represented by the client (i) 202. The cloud storage service side may be represented by the service (S) 204. Both sides are separated by a vertical dashed line.

The client may invoke the operation, 206. This may comprise cryptographically signing the desired operation to a specific set of data managed by the cloud storage service and producing an invocation digital signature (t-sig). The client 202 may send a first INVOKE message to the server, 208. This first INVOKE message may comprise the signature (t-sig) and the intended operation (o).

The cloud storage service 204 processes this first INVOKE message, 210. The service 204 may sent a second REPLY message, 212. On the client-side 202, the second REPLY message may be processed, 214, resulting in the return operation result, 216. The client 202 may send a third COMMIT message to the service, 218. As a reaction, the service 204 will process this third COMMIT message. At this point it may be clear that the COMMIT may not denote a traditional commit in a database-sense. Changes to the data are not applied at this point in time.

If the service 204 has received the third COMMIT message, it may insert the operation (o) into a list of the committed operations (O) at the position denoted by a sequence number (q) associated with the operation (not shown). If empty spaces in the list of committed operations may be filled, 222, the service may prepare the forth UPDATE-AUTHENTICATION message, 224. This fourth UPDATE-AUTHENTICATION message may be sent, 226, to the client 202. From here, a fifth COMMIT-AUTHENTICATION message may be prepared and sent, 230, to the cloud storage service 204. This fifth COMMIT-AUTHENTICATION message may be processed: e.g., an authentication value (a') may be stored and the initially intended operation (o) may be executed resulting in the applied operation, 232.

In order to better understand specific execution steps of the described protocol blocks 210, 214, 220, 224, 228 and 232 they may be described in more detail.

Figure 3:
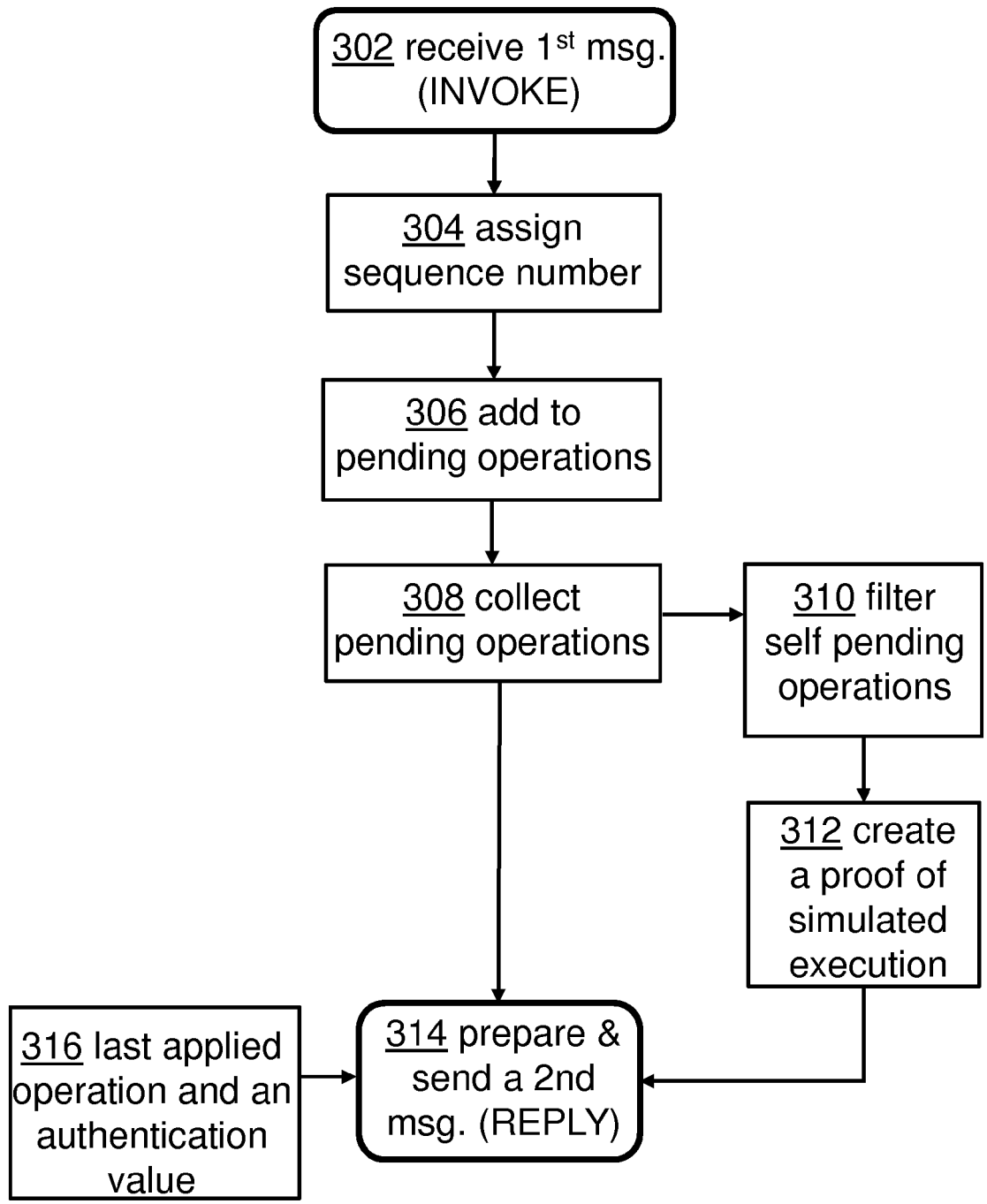
FIG. 3 shows a block diagram of a more detailed embodiment of block 210 of the method of FIG. 2.

FIG. 3 shows a block diagram of a more detailed embodiment of block 210 (process the first INVOKE message) of the method of FIG. 2. Upon receiving, 302, the first INVOKE message from the client (i) 202, the cloud storage service (S) 204 performs the following:

(i) assigning, 304, a global sequence number (t) to the operation (o), (ii) adding, 306, the operation (o) to a list of pending operations (I), (iii) extracting (compare 308, 310) a list of pending operations (w) from the list of future operations (I) that are relevant for the client (i) 202, (iv) creating, 312, a proof (s0) of simulated execution of the operation (o), (v) prepare and sending, 314, a second REPLY message to the client (i) 202, comprising the list of pending operations (w), the proof (s0), the global sequence number (t), a sequence number (b) pertaining to a most recently applied operation, and an authentication value for a last applied operation (a), 316. It may be noted that the sending 314 corresponds to the sending 212 of FIG. 2.

Figure 4:
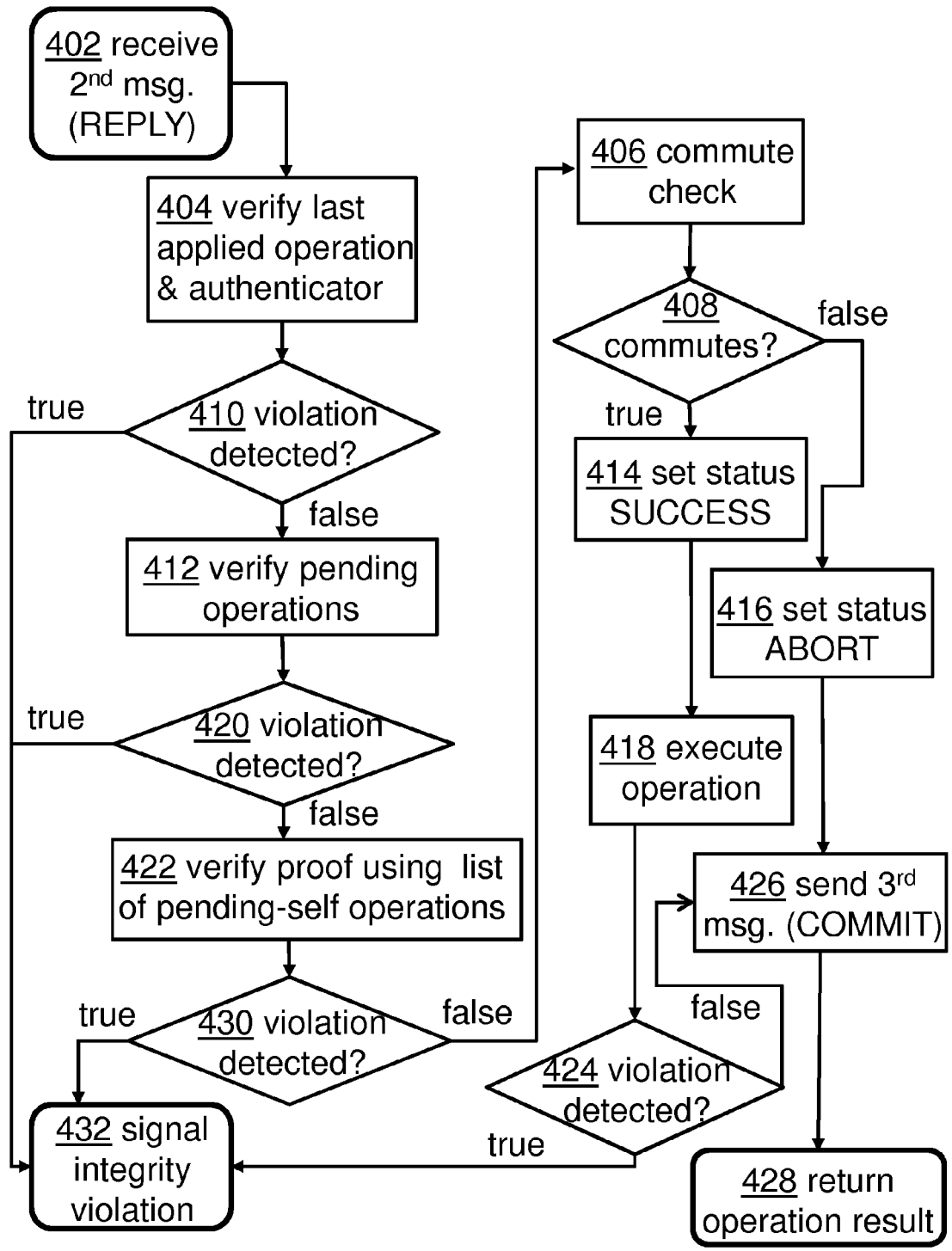
FIG. 4 shows a block diagram of a more detailed embodiment of block 214 of the method of FIG. 2.

FIG. 4 shows a block diagram of a more detailed embodiment of block 214 of the method of FIG. 2.

The client (i) 202, upon receiving, 402, the second REPLY message from the cloud storage service (S) 204, performs the following:

(i) verifying, 404, the message content, in particular the last applied operation and authenticator. If a violation is detected, 410, and a violation is signaled, 432, the process is terminated. In case no violation is detected, (ii) determining or verifying, 412, from the list of pending operations (w) a list of self-operations (pending-self), which are operations of the same client (i) 202, and a list of other-operations (pending-other), which are operations from different clients. If a violation is detected, 420, and a violation is signaled, 432, the process is terminated. In case no violation is detected, (iii) verifying, 422, the execution of the operations from the list of self-operations (pending-self), using the proof (s0). In case a violation is detected, 430, a violation is signaled, 432, and the process is terminated. In case no violation is detected, (iv) testing whether the operation (o) commutes, 406, 408, with the list of other-operations (pending-others) and determining a test result (z) from this. In case of "no commute", an ABORT status is set, 416, and sent, 426. In case of a successful commute testing, (v) if the test result (z) indicates success, 414, then computing a response (r) to the operation (o) and returning it, (vi) cryptographically signing the operation (o) and the test result (z) and producing a commitment digital signature (p-sig). Reference numeral 418 summarizes (v) and (vi). In case a violation is detected, 424, a violation is signaled, 432, and the process is terminated. In case no violation is detected, (vii) sending, 426, a third COMMIT message to the service (S), comprising the test result (z), the operation (o), and the commitment digital signature (p-sig), 428.

Figure 5:
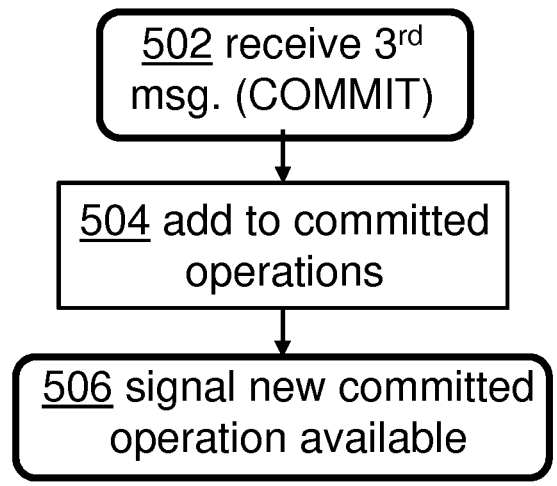
FIG. 5 shows a block diagram of a more detailed embodiment of block 220 of the method of FIG. 2.

FIG. 5 shows a block diagram of a more detailed embodiment of block 220 of the method of FIG. 2. The service (S) 204, upon receiving, 502, the third COMMIT message performing the following:

(i) inserting, 504, the operation (o) into a list of the committed operations (O) at the position denoted by a sequence number (q) associated to the operation (o) and signaling, 506, that a new committed operation is available.

Figure 6:
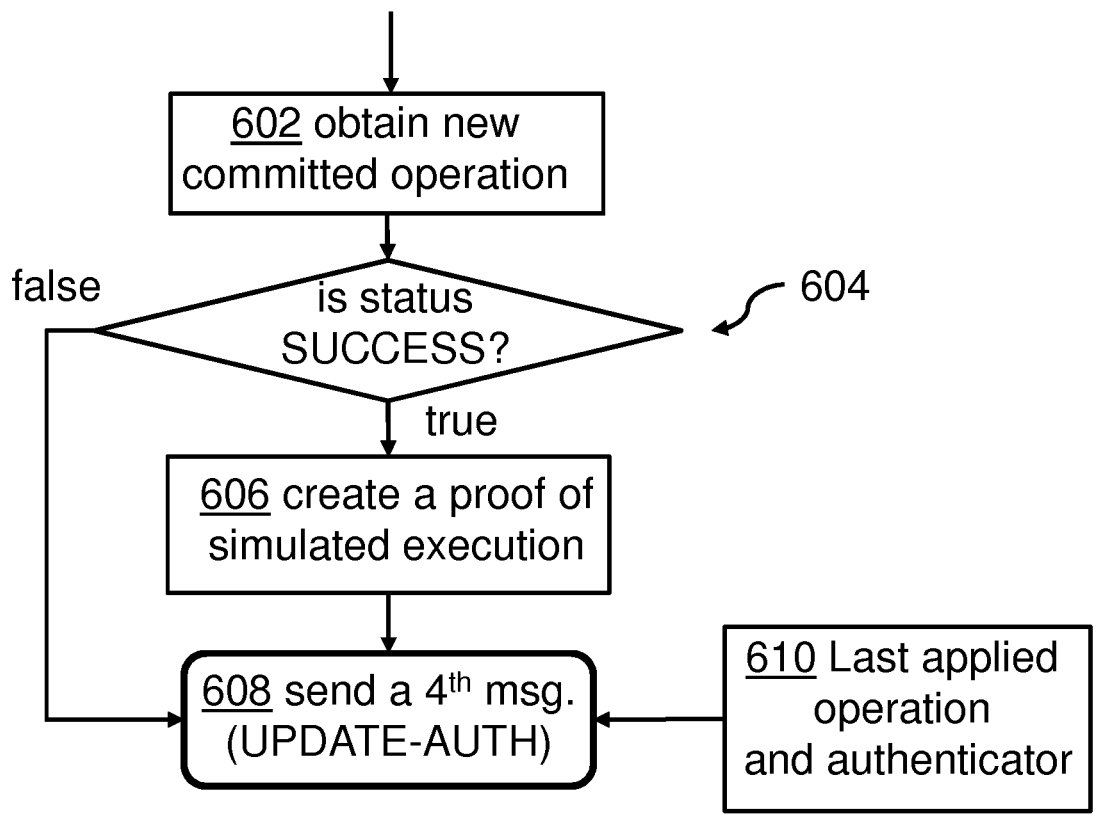
FIG. 6 shows a block diagram of a more detailed embodiment of blocks 224 and 226 of the method of FIG. 2.

FIG. 6 shows a block diagram of a more detailed embodiment of blocks 222 and 224 of the method of FIG. 2. The service (s) 204 iteratively processing the list of committed operations (O), waiting until empty spots are filled, 222, by obtaining, 602, a new committed operation and, (i) skipping over any operation with the test result (z) that indicates a failure, 604, (ii) creating, 606, a proof of execution (s0) for each of the operation (o) with the test result (z) that indicates success, (iii) sending, 608, a fourth UPDATE-AUTHENTICATION message, i.e., update authentication, to the client (i) 202 that issued the operation (o), containing the proof (s0) and an authentication value for the last applied operation (a), 610.

Figure 7:
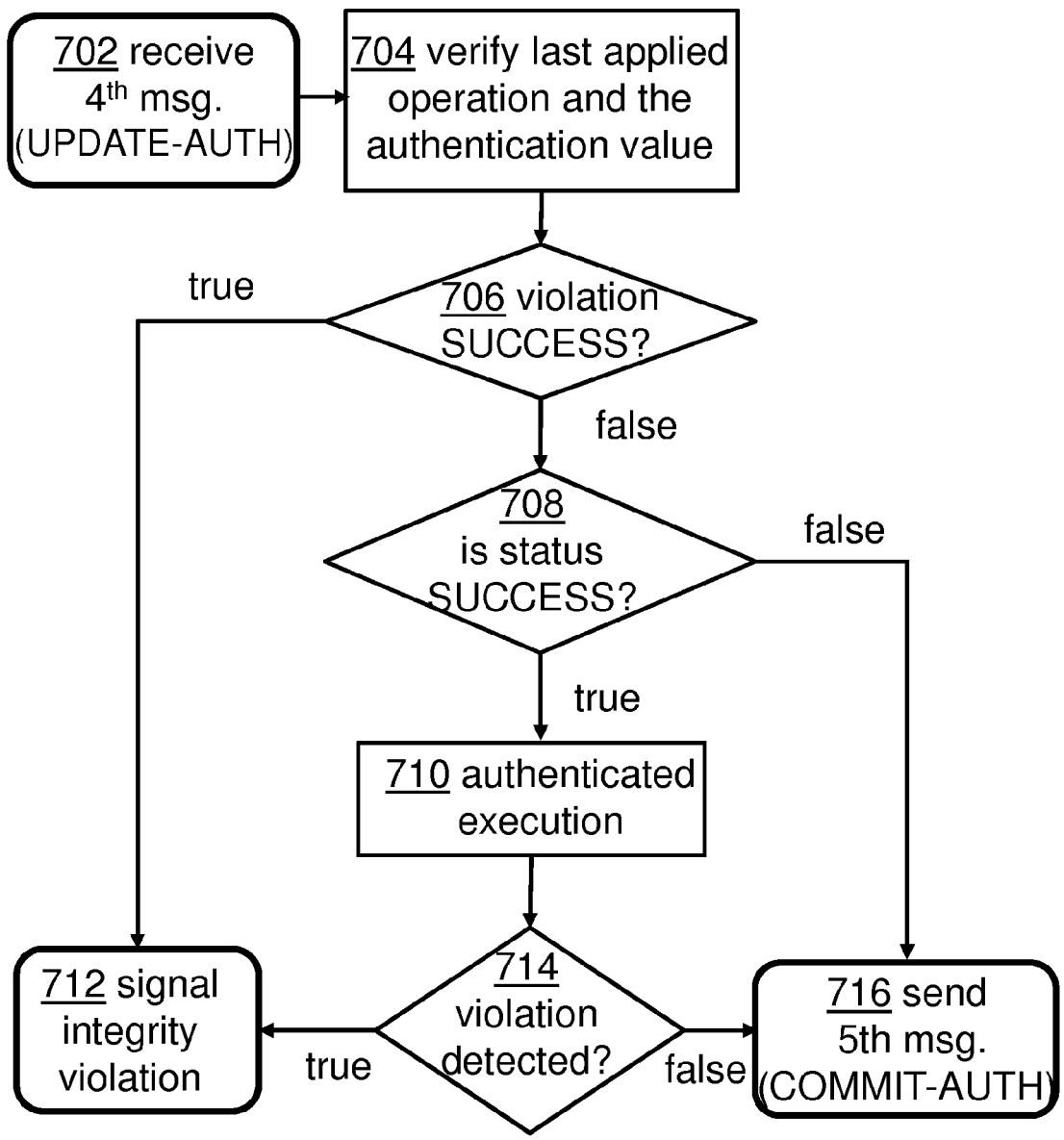
FIG. 7 shows a block diagram of a more detailed embodiment of block 228 of the method of FIG. 2.

FIG. 7 shows a block diagram of a more detailed embodiment of block 228 of the method of FIG. 2. The client (i) 202, upon receiving, 702 the fourth UPDATE-AUTHENTICATION message, performs the following:

(i) verifying, 704, the message content, (ii) verifying, 706, the execution of the operation (o), using the proof (s0), and obtaining an authentication value (a'). In case of a violation, an integrity violation is signaled, 712. In case no violation is determined, (iii) cryptographically signing the operation (o) and the authentication value (a') and producing a commitment digital signature (p-sig), 710. In case a violation is detected, 714, signal an integrity violation, 712. In case no violation is detected, (iv) sending, 716, a fifth COMMIT-AUTHENTICATION message, i.e., commit authentication, to the service (S) 204, comprising the authentication value (a') and the commitment digital signature (p-sig). It may be noted that the block 230 of FIG. 1 and block 716 may be identical.

Figure 8:
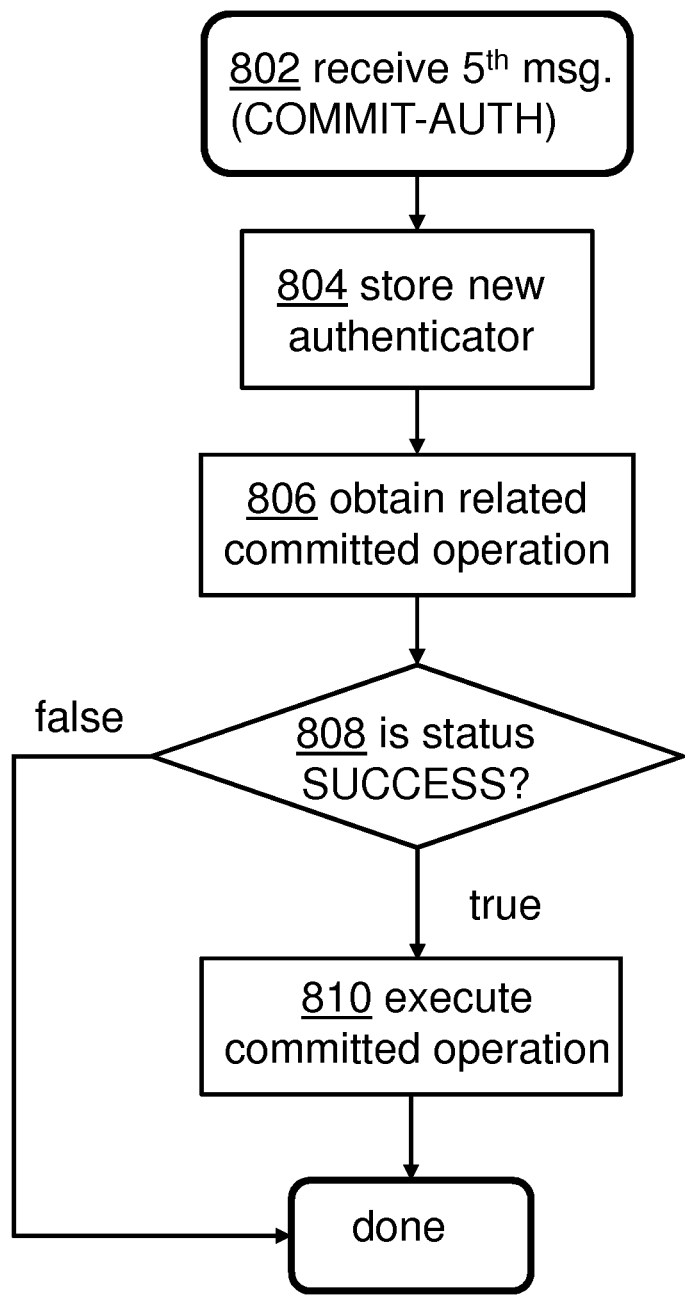
FIG. 8 shows a block diagram of a more detailed embodiment of block 232 of the method of FIG. 1.

FIG. 8 shows a block diagram of a more detailed embodiment of block 232 of the method of FIG. 2. The service (S) 204, upon receiving, 802, the fifth COMMIT-AUTHENTICATION message, performs the following:

(i) storing, 804, the authentication value (a'), and obtaining, 806, the related committed operation. In case of a failure, 808, the protocol is aborted. In case of SUCCESS, (ii) executing, 810, the committed operation (o) resulting in an applied operation (o). Again, the difference between a committed operation (end of first phase) and a (finally) applied operation (end of second phase) becomes clear.

Figure 9:
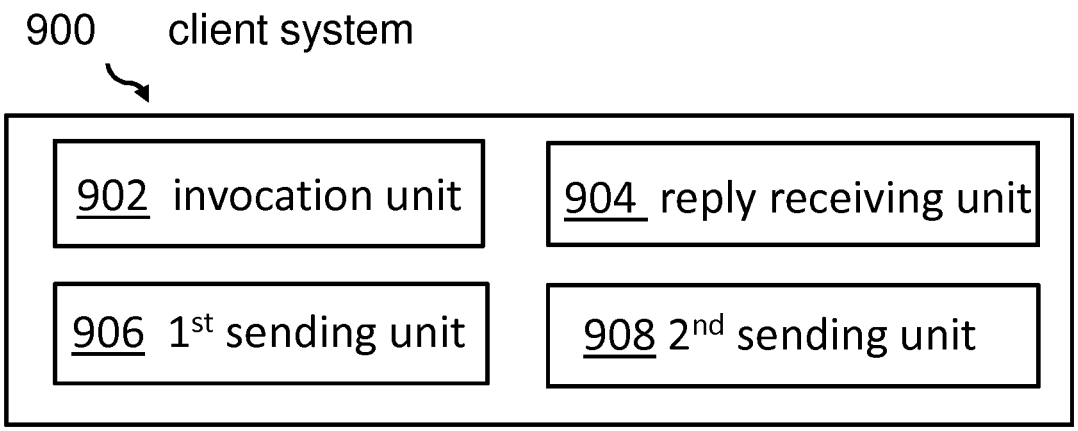
FIG. 9 shows a block diagram of client-side units.

FIG. 9 shows a block diagram of client-side units. A client system 900 out of a group of mutually trusted clients 108, 110, 112 for demanding services from a cloud storage service 204, may comprise (i) an invocation unit 902 configured to send an invocation message comprising a cryptographically signed operation (o) for data, stored on a server' storage 104 in an invocation digital signature (t-sig), (ii) a reply receiving unit 904 configured to receive from the server a reply-message comprising a list of pending operations, an authentication value (a) and proof (s0), (iii) a first sending unit 906 configured to send a commit message, in particular the third message comprising a test result (z) indicating that the operation is not in conflict with the pending operations list, the operation (o) and a commitment digital signature (p-sig), and (iv) a second sending unit 908, in particular for the fifth message, configured to send an authentication value (a') based on the operation (o) and a received proof (s0).

Figure 10:
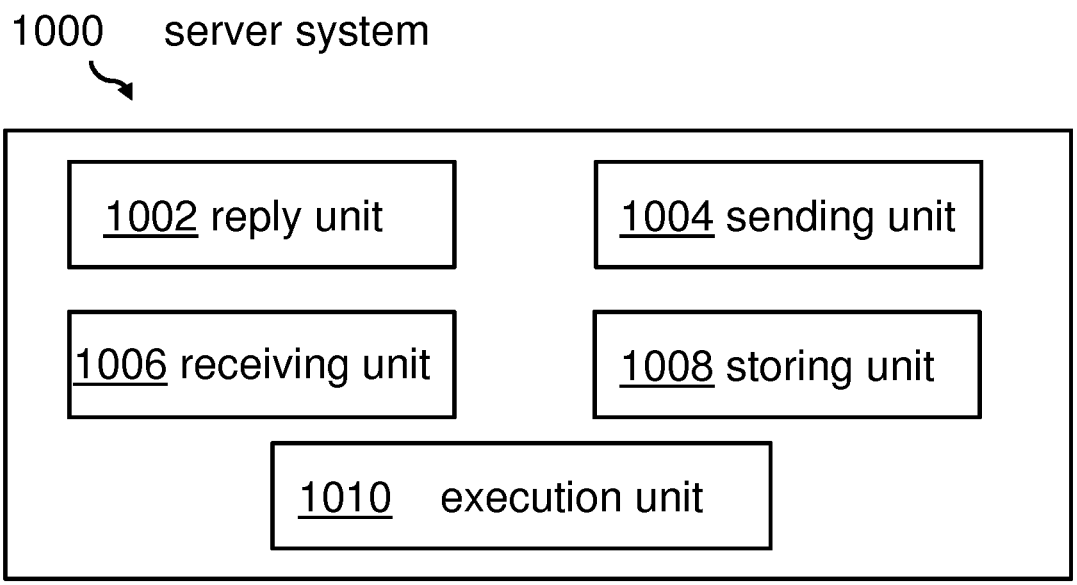
FIG. 10 shows a block diagram of service-side units.

FIG. 10 shows a block diagram of service-side units. A server system 1000 configured to perform a cloud storage service for data, wherein the cloud storage service comprises a set of operations, may comprise (i) a reply unit 1002 configured to receive an invocation message comprising a list of pending operations including an operation (o) to be executed, and a proof (s0), as well as a global sequence number (t), a sequence number (b) pertaining to the most recent operation, and an authentication value (a) of a last applied operation, (ii) a sending unit (1004) configured to send the proof (s0) and an authentication value (a) for the last applied operation, (iii) a receiving unit (1006) configured to receive a commit message comprising a commit message comprising a test result (z) indicating that the operation is not in conflict with the pending operations list, the operation (o) and a commitment digital signature (p-sig), and (iv) a storing unit 1008 configured to store a received authentication value (a'), and (v) an execution unit 1010 configured to execute the operation (o) to be executed resulting in an applied operation.

Figure 11:
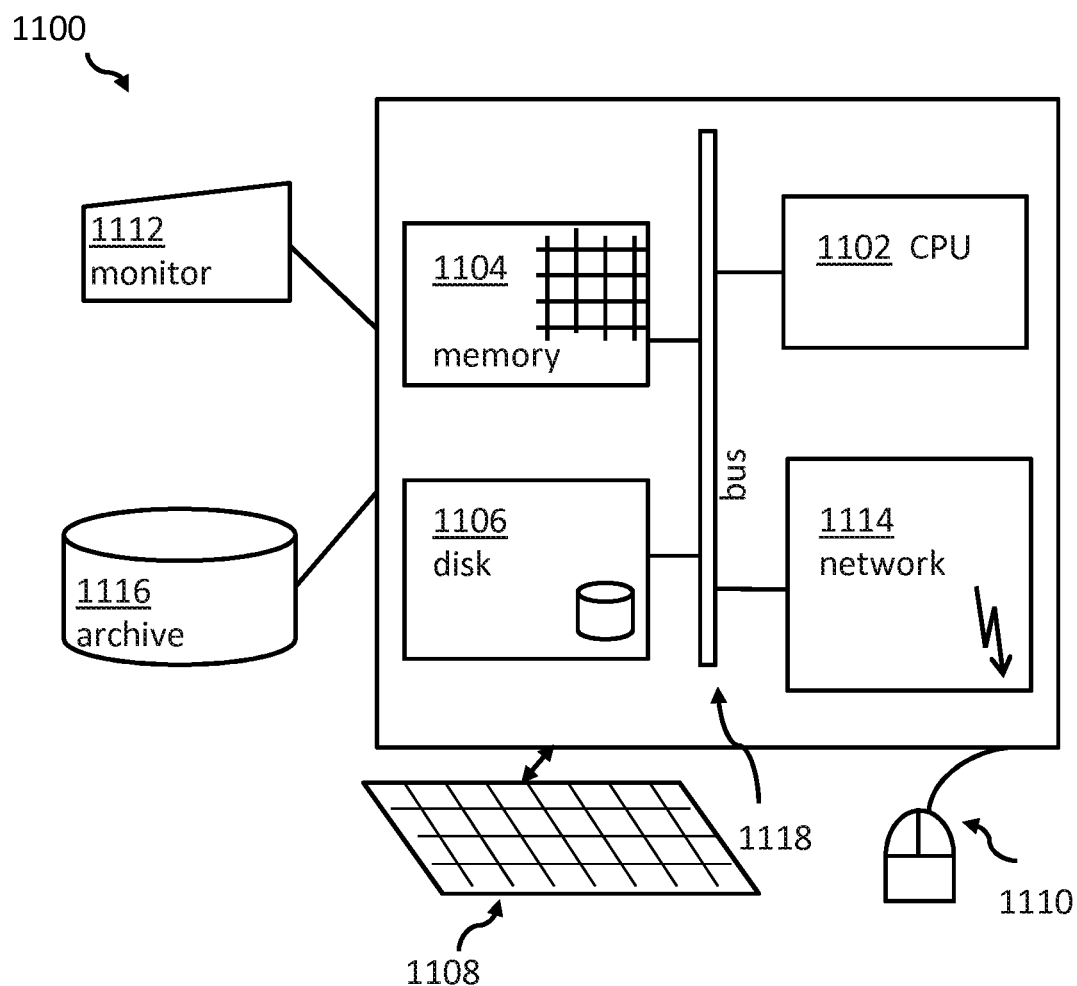
FIG. 11 shows a block diagram of an embodiment of a computing system used for client-side and/or service-side computers.

Embodiments of the client side and/or the server side of the invention may be implemented together with virtually any type of computer, regardless of the platform being suitable for storing and/or executing program code. For example, as shown in FIG. 11, a computing system 1100 may include one or more processor(s) 1102 with one or more cores per processor, associated memory elements 1104, an internal storage device 1106 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 1104 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 1116 for an execution. Elements inside the computer 1100 may be linked together by means of a bus system 1118 with corresponding adapters.

It may be noted that the internal disk 1106 and/or the archive or bulk storage 1116 may be used a storage for the cloud storage service. Also a disk sub-system such as a network-attached storage may be used.

The computing system 1100 may also include input means such as a keyboard 1108, a pointing device such as a mouse 1110, or a microphone (not shown). Alternatively, the computing system may be equipped with a touch sensitive screen as main input device. Furthermore, the computer 1100, may include output means such as a monitor or screen 1112 [e.g., a liquid crystal display (LCD), a plasma display, a light emitting diode display (LED), or cathode ray tube (CRT) monitor]. The computer system 1100 may be connected to a network [e.g., a local area network (LAN), a wide area network (WAN)], such as the Internet or any other similar type of network, including wireless networks via a network interface connection 1114. This may allow a coupling to other computer systems, or a storage network, or a tape drive. Those, skilled in the art will appreciate that many different types of computer systems exist, and the aforementioned input and output means may take other forms. Generally speaking, the computer system 1100 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operations to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The Term Cloud Computing

In this document, cloud storage service is mentioned several times. Such a service may belong to cloud computing in general, which is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models and four deployment models.

Essential Characteristics of cloud computing comprise:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing used comprise:
(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.
(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment Models for Cloud Computing Comprise
(i) Private cloud. The cloud infrastructure is operated solely by an organization. It may be managed by the organization or a third party and may exist on premise or off premise.
(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.
(iii) Public cloud. The cloud infrastructure is made available to the general public or a large industry group and is owned by an organization selling cloud services.
(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software may take full advantage of the cloud paradigm by being service-oriented with a focus on statelessness, low coupling, modularity, and semantic interoperability.

The invention claimed is:

1. A method for securing integrity and consistency of a cloud storage service to a group of mutually trusted clients comprising a first client and a second client, the method comprising:
offering, by the cloud storage service, a set of operations with respect to stored data to the group of mutually trusted clients;
receiving, by the cloud storage service from the first client, a request to consume a particular operation of the set of operations;
receiving, by the cloud storage service from the first client, a first set of one or more commands in connection with the requested particular operation;
executing, by the cloud storage service, the particular operation at least in part by executing the first set of one or more commands;
sending, by the cloud storage service, proof of execution of the particular operation to the first client;
receiving, by the cloud storage service from the second client, a second set of one or more commands; and
executing, by the cloud storage service, at least one operation of the set of operations at least in part by executing the second set of one or more commands,
wherein the first client verifies execution of the first set of one or more commands and does not verify execution of the second set of one or more commands when consuming the particular operation,
wherein the first client verifies execution of the first set of one or more commands based at least in part on the proof of execution, and
wherein each client detects data correctness of the cloud storage service based on a protocol providing fork-linearizablity.

2. The method of claim 1, wherein the data correctness comprises one or more of integrity violations and consistency violations.

3. The method of claim 1, wherein the operation is selected from the group of: a read operation, a write operation, an update operation, and a delete operation.

4. The method of claim 1, further comprising establishing an order in a pending operations list indicating the order in which operations from different clients will be applied to the stored data by receiving a commit-message for a committed operation.

5. The method of claim 4, further comprising sending an update-authentication-message comprising the proof of the execution (s0) of the operation, and an authentication value for the last applied operation.

6. The method of claim 5, further comprising receiving a second authentication value and a commitment digital signature, wherein the second authentication value is generated based on the first authentication value and the commitment digital signature is generated by cryptographically signing the operation and the second authentication value.

7. The method of claim 6, further comprising:
storing the second authentication value; and
executing, by the cloud storage service, the operation on the data resulting in an applied operation.

8. A client system associated with a first client out of a group of mutually trusted clients for demanding services from a cloud storage service, the client system comprising:
at least one memory storing computer-executable instructions; and
at lease one hardware processor configured to access the at lease one memory and execute the computer-executable instructions to:
send an invocation message comprising a cryptographically signed operation for data in an invocation digital signature;
receive a reply-message comprising a list of pending operations, an authentication value, and proof, wherein the list of pending operations includes a pending-other operation associated with a second client of the group of mutually trusted clients that is different from the first client;
determine that the operation is not in conflict with the pending operations list by determining that the operation commutes with the pending-other operation;
send a commit message comprising a test result indication that the operation is not in conflict with the pending operations list, the operation and a commitment digital signature; and
send an authentication value based on the operation and a received proof.

9. A server system configured to perform a cloud storage service for data, wherein the cloud storage service comprises a set of operations, the server system comprising:
at least one memory storing computer-executable instructions; and
at lease one hardware processor configured to access the at lease one memory and execute the computer-executable instructions to:
receive, from a first client, an invocation message comprising an indication of an operation to be executed;
send, to the first client, a list of pending operations, an authentication value for a last applied operation, and a proof, wherein the list of pending operations includes a pending-other operation associated with a second client different from the first client;
receive a commit message comprising a test result indication that the operation is not in conflict with the pending operations list, the operation, and a commitment digital signature, wherein the operation is determined not to be in conflict with the pending operations list based on a determination that the operation commutes with the pending-other operation;
store a received authentication value; and
execute the operation to be executed resulting in an applied operation.

10. A non-transitory computer readable storage medium having computer readable instructions stored thereon that, when executed by a computer, implement a method for securing integrity and consistency of a cloud storage service to a group of mutually trusted clients comprising a first client and a second client, the method comprising:
offering, by the cloud storage service, a set of operations with respect to stored data to the group of mutually trusted clients;
receiving, by the cloud storage service from the first client, a request to consume a particular operation of the set of operations;
receiving, by the cloud storage service from the first client, a first set of one or more commands in connection with the requested particular operation;
executing, by the cloud storage service, the particular operation at least in part by executing the first set of one or more commands;
sending, by the cloud storage service, proof of execution of the particular operation to the first client;

receiving, by the cloud storage service from the second client, a second set of one or more commands; and executing, by the cloud storage service, at least one operation of the set of operations at least in part by executing the second set of one or more commands, wherein the first client verifies execution of the first set of one or more commands and does not verify execution of the second set of one or more commands when consuming the particular operation, wherein the first client verifies execution of the first set of one or more commands based at least in part on the proof of execution, and wherein each client detects data correctness of the cloud storage service based on a protocol providing fork-linearizablity.

11. The storage medium of claim 10, wherein the data correctness comprises one or more of integrity violations and consistency violations.

12. The storage medium of claim 10, wherein the operation is selected from the group of: a read operation, a write operation, an update operation, and a delete operation.

13. The storage medium of claim 10, wherein the method further comprises establishing an order in a pending operations list indicating the order in which operations from different clients will be applied to the stored data by receiving a commit-message for a committed operation.

14. The storage medium of claim 13, wherein the method further comprises sending an update-authentication-message comprising the proof of the execution (s0) of the operation, and an authentication value for the last applied operation.

15. The storage medium of claim 14, wherein the method further comprises receiving a second authentication value and a commitment digital signature, wherein the second authentication value is generated based on the first authentication value and the commitment digital signature is generated by cryptographically signing the operation and the second authentication value.

16. The storage medium of claim 15, wherein the method further comprises:
    storing the second authentication value; and
    executing, by the cloud storage service, the operation on the data resulting in an applied operation.

* * * * *